(12) United States Patent
Armstrong et al.

(10) Patent No.: US 6,604,224 B1
(45) Date of Patent: Aug. 5, 2003

(54) METHOD OF PERFORMING CONTENT INTEGRITY ANALYSIS OF A DATA STREAM

(75) Inventors: James B. Armstrong, Princeton, NJ (US); Muyu Guo, Plainsboro, NJ (US); Jesse S. Lerman, Kendall Park, NJ (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

(21) Appl. No.: 09/459,217

(22) Filed: Dec. 10, 1999

Related U.S. Application Data

(60) Provisional application No. 60/127,115, filed on Mar. 31, 1999.

(51) Int. Cl.[7] .................. G06F 11/00; H04N 7/173; H04L 1/00
(52) U.S. Cl. .................. 714/819; 714/809; 725/92; 725/115
(58) Field of Search .................. 725/92, 93, 115, 725/116, 146, 88; 386/21; 714/746, 748, 750, 758, 770, 776, 807, 808, 809, 819

(56) References Cited

U.S. PATENT DOCUMENTS

| | | | | |
|---|---|---|---|---|
| 5,473,362 A | * | 12/1995 | Fitzgerald et al. | 725/92 |
| 5,579,527 A | | 11/1996 | Chin et al. | 395/800 |
| 5,671,377 A | * | 9/1997 | Bleidt et al. | 345/474 |
| 5,864,682 A | * | 1/1999 | Porter et al. | 370/468 |
| 6,128,467 A | * | 10/2000 | Rege | 709/219 |
| 6,275,507 B1 | * | 8/2001 | Anderson et al. | 370/487 |
| 6,438,140 B1 | * | 8/2002 | Jungers et al. | 370/471 |

* cited by examiner

*Primary Examiner*—Albert Decady
*Assistant Examiner*—Matthew C. Dooley
(74) *Attorney, Agent, or Firm*—Moser, Patterson & Sheridan LLP

(57) ABSTRACT

A method providing integrity analysis of content data streams within an information distribution system. On-demand content is divided into a plurality of content portions to be severally distributed among disk drives of an array of disk drives. A data structure is used for dividing the content into the plurality of content portions. Method is used to check integrity of content prior to provisioning thereof.

19 Claims, 3 Drawing Sheets

METHOD OF PERFORMING CONTENT INTEGRITY ANALYSIS OF A DATA STREAM

CROSS-REFERENCE TO RELATED APPLICATIONS

This application claims benefit of U.S. Provisional Patent Application Ser. No. 60/127,115 which was filed on Mar. 31, 1999 and is incorporated herein by reference in its entirety.

BACKGROUND OF THE INVENTION

1. Field of the Invention

The invention relates to communications systems generally and, more particularly, the invention relates to an improved method for analyzing a stream of data to assure integrity of the content within the stream.

2. Description of the Background Art

In several communications systems, the data to be transmitted is compressed so that the available system bandwidth is used more efficiently. For example, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, which too is incorporated herein by reference.

Information distribution systems utilizing information streams conforming to the above standards or subsets of the above standards are known. For example, an interactive information distribution system provided by DIVA Systems Corporation of Redwood City, Calif. is described in more detail in U.S. Pat. No. 6,253,375, issued Jun. 26, 2001 and incorporated herein by reference in its entirety. The DIVA VOD system distributes audio-visual information from a central server to individual subscribers utilizing MPEG-like information streams. The DIVA VOD system also allows subscribers to interactively control the delivery of audio-visual information streams using consumer-friendly commands, such as fast-forward (FF), rewind (REW), pause (PAUSE), play (PLAY) and the like that correspond to various tracks within the streams.

The DIVA VOD system stores content, such as movies, sporting events, television programs and the like on a server, illustratively a hard disk array, for subsequent transmission to subscribers within the system. The server is "provisioned" from a remote content source. The provisioning content is typically provided as an MPEG-2 transport stream including video information and associated audio information. The content stored within the DIVA system comprises a play track, a fast forward track, a rewind track, associated audio tracks and other data related to the content stream.

It is important to ensure that the content stored on the server is error free and appropriate for subsequent transmission to subscribers. Similarly, it is important to insure that content read from the servers for transmission to subscribers request in the content is retrieved from the servers in a relatively error free manner.

Presently, most VOD systems utilize a circular redundancy check (CRC) to determine if content being stored and/or retrieved from a server is error free. If the portion of content being stored and/or retrieved from a server fails the CRC check, then an error handling routine is invoked. In the case of portions of content that are stored or retrieved out of order, such stored or retrieved portions will likely pass a CRC error check test. However, since such portions have been stored or retrieved out of order, subsequent presentation of these temporally shifted or non-contiguous portions by a subscriber will result in an unsatisfying VOD experience.

Unfortunately, CRC error checking may miss certain errors within the main or auxiliary information streams forming the content being checked.

Specifically, the CRC check will not detect an error condition where "correct" content has been stored or retrieved out of sequence (where portions of content are arranged in a sequence), thereby allowing the storage or retrieval of improper information. In either case, a user or subscriber within the VOD system may receive unrequested programming, temporally shifted programming, video information exhibiting undesirable artifacts, audio information exhibiting undesirable oral artifacts, video and audio information exhibiting poor "lip synchronization" and other errors.

Therefore, it is seen to be desirable to provide a method for assuring content integrity in a manner avoiding limitations of the simple circular redundancy check (CRC) typifying present VOD content server operations. More specifically, it is seen to be desirable to provide a method for performing a "content integrity check" of content being stored or retrieved from, illustratively, a server within a video on demand system.

SUMMARY OF THE INVENTION

The disadvantages heretofore associated with the prior art are overcome by the present invention of a method providing integrity analysis of content data streams within an information distribution system.

An aspect of the present invention is a system for content-on-demand. Service provider equipment, including a session controller, an information server and a transport processor, is in communication with subscriber equipment via a distribution network. The server provider equipment is configured to provide content on-demand in response to a request from the subscriber equipment. The content is divided into a plurality of content portions severally distributed among disks of an array of disks. Each of the content portions comprises an identification field, a number field, a track-type field and a check field.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a method providing enhanced integrity analysis of content streams in an information distribution system. It is noted that the invention will be primarily described within the context of a video on demand system in which content, illustratively video information, is divided into a plurality of time extents, where each extent represents a predefined amount of video information and associated audio information. In the exemplary video on demand system, the extent size is approximately 2 seconds. However, any extent size may be used. Additionally, it must be noted that the particular data structures discussed with respect to the invention are provided as examples only. Other data structures may be processed using the methods of the subject invention.

While the invention will be primarily described within the context of an interactive information distribution system, it will be appreciated by those skilled in the art that the invention has wider applicability. Specifically, the invention may be advantageously utilized in any system storing audio visual information or other forms of data having a defined presentation order or appropriate sequence.

Figure 1:
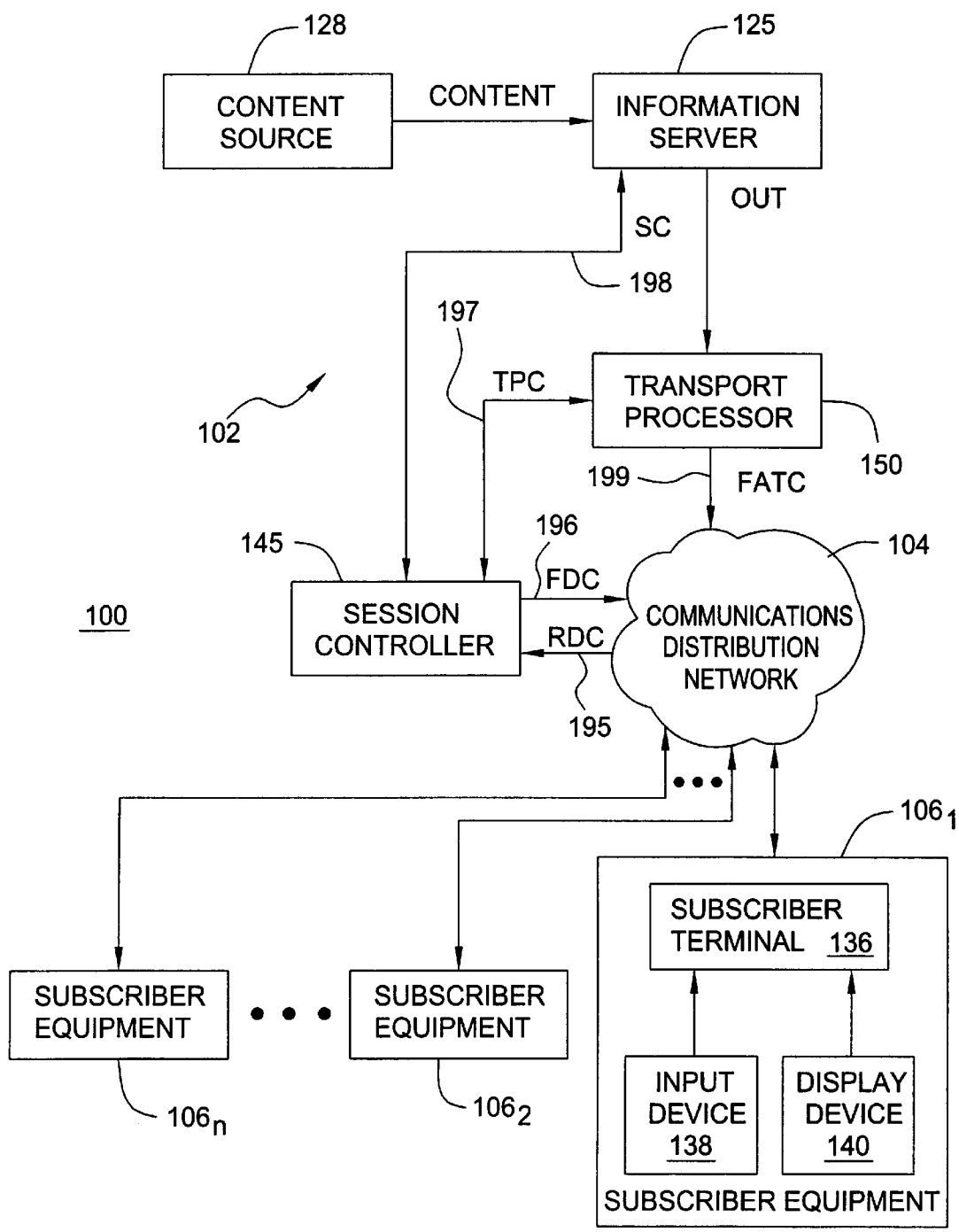
FIG. 1 depicts a high level block diagram of an interactive information distribution system that employs a method according to the subject invention.

FIG. 1 depicts a high level block diagram of an interactive information distribution system. Specifically, FIG. 1 depicts a high level block diagram of an interactive information distribution system 100 containing the present invention. The system 100 contains service provider equipment 102, a communications distribution network 104 and subscriber equipment 106$_n$, where n is an integer greater than zero.

The service provider equipment 102 comprises a content source 128, an information server 125, a session controller 145 and a transport processor 150. Briefly, the session controller 145, in response to a request(s) from subscriber equipment 106, causes the requested content to be retrieved from the information server 125 and provided to the transport processor 150. The transport processor 150 combines or multiplexes the retrieved content to provide an output data stream for the requesting subscriber(s). The output data stream is conditioned for transport to the requested subscriber via a forward application transport channel (FATC) 199 within the communications distribution network 104.

The content source 128 comprises, illustratively, a remote content provider such as a movie studio a television network as a secondary storage (i.e. mass storage) facility used to warehouse content. The content source 128 provides a content provisioning stream CONTENT to the information server 125. In this manner the system 100 establishes a base of available content titles.

The information server 125 is used to store at least a portion of content such as movies, television programs and other information offerings of the interactive information distribution system 100 of FIG. 1. Additionally, the information server 125 is used to store assets such as bit map imagery, graphic overlay, control scripts and the like. The assets may comprise, for example, navigation assets that are used by a set top terminal to interactively navigate, and select for viewing, the offerings or content available from the service provider equipment 102. The information server 125, in response to a control signal SC produced by the session controller 145, provides content and/or asset data to the transport processor 150.

An information server 125 suitable for use in the present invention is described by Chin et al. in U.S. Pat. No. 5,579,527 and incorporated herein by reference in its entirety. A system for supplying content streams to multiple users suitable for use in the present invention is described by Bleidt et al. in U.S. Pat. No. 5,671,377 and incorporated herein by reference in its entirety. A method and apparatus for minimizing disk drive access time in, for example, a disk drive array and suitable for use in the present invention is described by Armstrong in commonly assigned U.S. patent application Ser. No. 08/818,172 (Attorney Docket No. 11635), filed on Mar. 14, 1997 and incorporated herein by reference in its entirety.

Content stored on the information server 125 is divided into a plurality of "extents," where each extent represents an amount of content to be presented within a single service period, illustratively two seconds worth of video information and associated audio information. The information server 125 comprises a plurality of hard disks arranged as a disk array. The content is distributed, on an extent-by-extent basis, across the available disk drives within the disk array. For example, assuming that a disk array comprises 10 disks, the first 10 extents of the content stream are stored on, respectively, disks 1–10. Similarly, the next 10 extents of the content stream are stored on disks 1–10, respectively. In this manner, the content is "striped" across the plurality of disks forming the disk array. As discussed in the above-referenced patents and patent application, storing content in this manner enables rapid storage and retrieval of the content. A data structure useful in providing such extents will be described in more detail below with respect to FIG. 2.

The session controller 145 provides session control of the information flowing to and from the information server 125, and may be generally described as a system providing or controlling communications between, for example, a cable system head-end and one or more set top terminals 136. The session controller 145 produces the storage control signal SC 198 for controlling and communicating with the information server 125, and a transport processor control signal TPC 197 for controlling and communicating with the transport processor 150. In response to a user request for particular content, the session controller 145 causes the requested content file and to be streamed from the information server 125 to the transport processor 150.

The session controller 145 sends data, such as commands, encryption keys and the like, to the set top terminals via a forward data channel (FDC) 196. The session controller 145 receives data, such as information stream requests and session initiation data (set top identification, capability and the like) via a reverse data channel (RDC) 195. The FDC 196 and RDC 195 are supported by the communications distribution network 104 and comprise relatively low bandwidth data channels such as one-two megabits per second data channels utlizing QPSK, QAM, or other modulation techniques. The FDC 196 and RDC 195 are also known as "out-of-band" channels, while the relatively high bandwidth forward application transport channel (FATC) 199 is also known as an "in-band" channel. The session controller 145 contains an interface device for sending control information via the forward data channel FDC 196 and receiving control information and request information via the reverse data channel RDC 198 using the so-called "out-of-band" carrier frequencies.

The transport processor 150 accomplishes all of the forward content channel transmission interface requirements of the system 100 of FIG. 1. Specifically, the transport processor 150 Is coupled to subscriber equipment via the forward applications transport channel (FATC) 199. That is, the transport processor 150 is capable of providing a plurality of scrambled or unscrambled content and/or asset streams modulated onto various carrier frequencies suitable for use in the distribution network 104. The FATC is supported by the distribution network 104 and comprises a relatively high bandwidth communications channel well suited to carrying video, audio and data such as, for example, multiplexed MPEG-2 transport packets. It should be noted that data normally conveyed to a set top terminal 136 via the FDC 196 may be included in the FATC data stream. The transport processor 150 also contains a modulator for modulating the combined content and asset stream onto one or more carrier frequencies for transmission on the FATC 199, the so-called "in-band" carrier frequencies.

The communications distribution network 104 can be any one of a number of conventional broadband communications networks that are available such as a fiber optic network, a telephone network, a cable television network and the like. For example, if the network is a hybrid fiber-coax network, the transmission transport technique used In both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or a set top box 136, a display device 140 (e.g. a conventional television) and a user input device 138 (e.g. a remote control device). Each set top terminal (STT) 136 receives the data streams from the FATC, demodulates the received data streams and, in the case of video streams, processes the demodulated video streams for subsequent display on the display device 140. In the case of receiving scrambled data streams, the STT 136 descrambles the received data streams using the descrambling messages (DM) provided to the STT 136 via the FATC 199 or the FDC 196. The STT 136 uses the authorization messages (AM) provided via the FATC or FDC to determine if a descrambling of the received scrambled stream is authorized. In addition, the set top terminal 136 accepts commands from the remote control input device 138 or other input device. These commands are formatted, modulated, and transmitted through the distribution network 104 to the session controller 145. Typically, this transmission is accomplished through the reverse data channel RDC 195. These commands are preferably transmitted through the same network used to transmit information to the set top terminal 136. However, the RDC coupling the set top terminal to the provider equipment 102 may be a separate network, e.g. a FATC through a television cable network and an RDC through a telephone network. The telephone network could also support the FDC.

The invention addresses several types of errors that may occur in a system storing and providing content data on an extent-by-extent basis. A first type of error comprises the standard data error, such as corruption of some or all of the audio-visual data forming an extent. Since this type of error is likely to be trapped using the standard CRC technique, the subject invention utilizes CRC techniques to screen for this error.

Second type of error comprises the non-contiguous storage or retrieval of extents, either within a single storage medium or a plurality of storage media. For example, in the exemplary VOD system 100 of FIG. 1, a plurality of disk drives within a disk drive array are used to store data that has been striped across the array. In this example, contiguous extents are stored in logically adjoining disk drives. However, since contiguous extents are stored on different disks within the disk array, it is possible for hardware or software errors in the disk array control system to allow a storage or retrieval of extents to occur out of sequence. Thus, rather than a temporally contiguous stream of extents being provided to a subscriber, the actual stream provided to the subscriber may include "transposed" extents or other non-sequential or temporal aberrations in the order of extent delivery period. Such errors are not detected by the CRC error checking algorithms, since the actual audio and/or video information stored within the extent is not incorrect.

A third type of error that may occur is the streaming of an incorrect track to the subscriber. For example, if a subscriber presently receiving the play track of the movie decides to enter a fast forward mode of operation, the fast forward request is processed by the subscriber equipment 102 which responsibly changes the stream provided to the subscriber from the play track to the fast forward track. The play track if left at a particular extent and the fast forward track is entered at an extent indexed to the particular extent of the play track. In this manner transitioning to a fast forward mode of operation is effective.

A fourth type of error that may occur is a streaming of an incorrect content stream to the subscriber. For example, if a subscriber is presently receiving a requested content stream such as a juvenile television program, it is highly undesirable to have the server transition to an incorrect content stream, such as an adult movie. Therefore, each extent is associated with a particular content stream identifier that is unique to the content stream. In this manner, such incorrect content stream delivered to subscribers is avoided.

The subject invention addresses all of the error sources described above. The subject invention utilizes a unique data structure to enable trapping of the above errors and a corresponding method utilizing that structure to provide such error trapping functionality. The data structure of the subject invention will be discussed in detail below with respect to FIG. 2, while the method utilizing the data structure will be discussed in more detail below with respect to FIG. 3.

Figure 2:
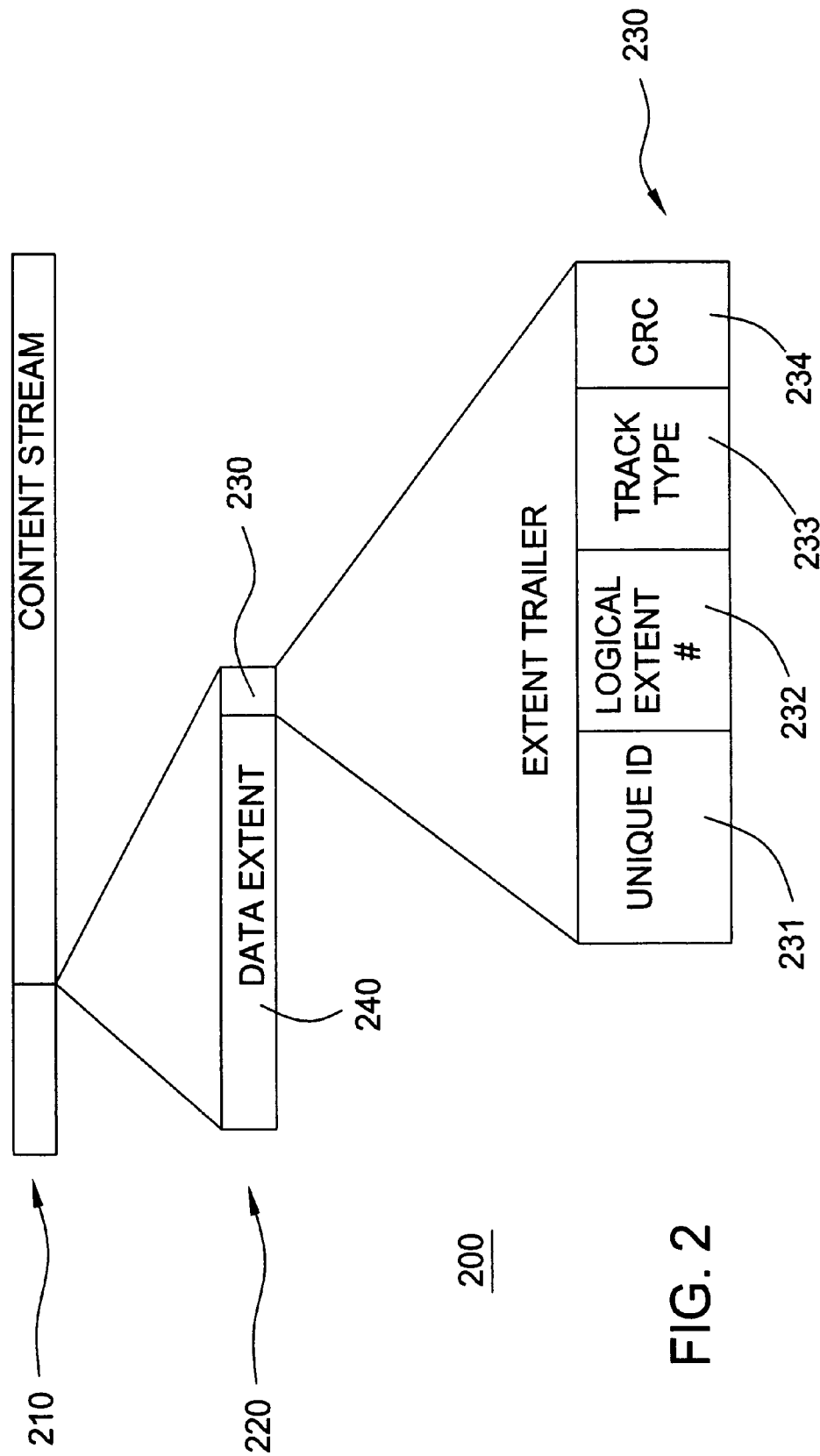
FIG. 2 depicts a graphical representation of data structures suitable for use in the present invention.

FIG. 2 depicts a graphical representation of data structures suitable for use in the present invention. Specifically, a content stream 210, illustratively a movie, sporting event, television program, or other form of content, is divided into a plurality of extents. Each extent represents, illustratively, two seconds worth of content. An extent 220 comprises a plurality of packets, illustratively DIVA DVB-ASI (DASI) packets, MPEG-2 packets or other packets suitable for transporting the above-described audio-visual Information streams, including the various tracks (i.e., the "PLAY," "FF" and "REW"tracks). Together, the plurality of packets forming each extent contain all the content information appropriate to the temporal period represented by the respective extent. The DASI packets are well adapted to transmission via a gigabit per second network medium, such as described in more detail in commonly-assigned, simultaneously-filed U.S. patent application Ser. No. 09/458,339 (Attorney Docket No. 051).

Referring to FIG. 2, each extent 220 comprises a data extent 240 and an extent trailer 230. The data extent 240 comprises a plurality of packets, such as MPEG-2 transport packets or other packet structures supporting video, audio and data information. The extent trailer 230 comprises a plurality of fields useful in processing each extent according to the methods of the present invention. Specifically, the extent trailer 230 comprises a unique content identifier ("UniqueID") field 231, a logical extent number field 232, a track-type field 233 and a circular redundancy check (CRC) field 234.

The content identifier or UniqueID field 231 is used to uniquely identify the content stream within the interactive information distribution system 100 of FIG. 1. Specifically, each content stream utilized by the system has associated with it a UniqueID. The UniqueID field 231 enables stream processing, storage and transmission elements within the interactive information distribution system 100 to ensure that each of a plurality of extents being stored, retrieved, processed or transmitted as part of the stream are, in fact, part of the appropriate stream, as defined by information stored within the UniqueID field 231. In this manner, the storage or transmission of corresponding extents from entirely different content streams may be avoided. For example, the streaming to a subscriber of an adult program rather than a requested juvenile program may be avoided.

The logical extent field 232 provides a number indicative of the relative position of the data extent 220 within the content stream 210. Specifically, the content stream 210 is divided into a plurality of data extents 220 which must be presented in a particular order. To ensure appropriate presentation of the extents, each extent is numbered in a sequential manner such that contiguous extents within the content stream have information within their respective logical extent fields 232 indicative of this contiguous placement. Thus, where data extents 220 are processed, stored, retrieved or transmitted in a particular order, the logical extent field 232 is used to ensure that the appropriate order is maintained, thereby ensuring orderly presentation of the extents 220 forming a content stream 210.

The track-type field 233 indicates the type of track provided by the content stream 210. As previously noted, the DIVA video on demand system allows "VCR-like" functionality such that users may select a "play" track, a "fast forward" track or a "rewind" track. The type of track provided by the plurality of data extents 220 forming a content stream 210 is denoted by the track-type field 233. In this manner, if a user selects a fast forward track of a content stream, data extents not associated with the fast forward track (per track-type field 233) may be processed in a manner avoiding transmission of such data extents to the user.

The circular redundancy check (CRC) field 234 is used to provide a check of the integrity of the content within the data extent 240. That is, a CRC operation is performed on the information within the data extent 240 during the initial formation of a data extent 220. By utilizing the CRC field, storage, retrieval, processing or transmission elements within the interactive information distribution system 100 of FIG. 1 may determine if the data extent 240 within the extent 220 is corrupted. In the case of a corrupted data extent, a replacement data extent 220 may be retrieved, a masking or correction routine may be invoked to, respectively, mask or correct the error within the data extent 240 or other processing error correction processing measures may be taken.

Figure 3:
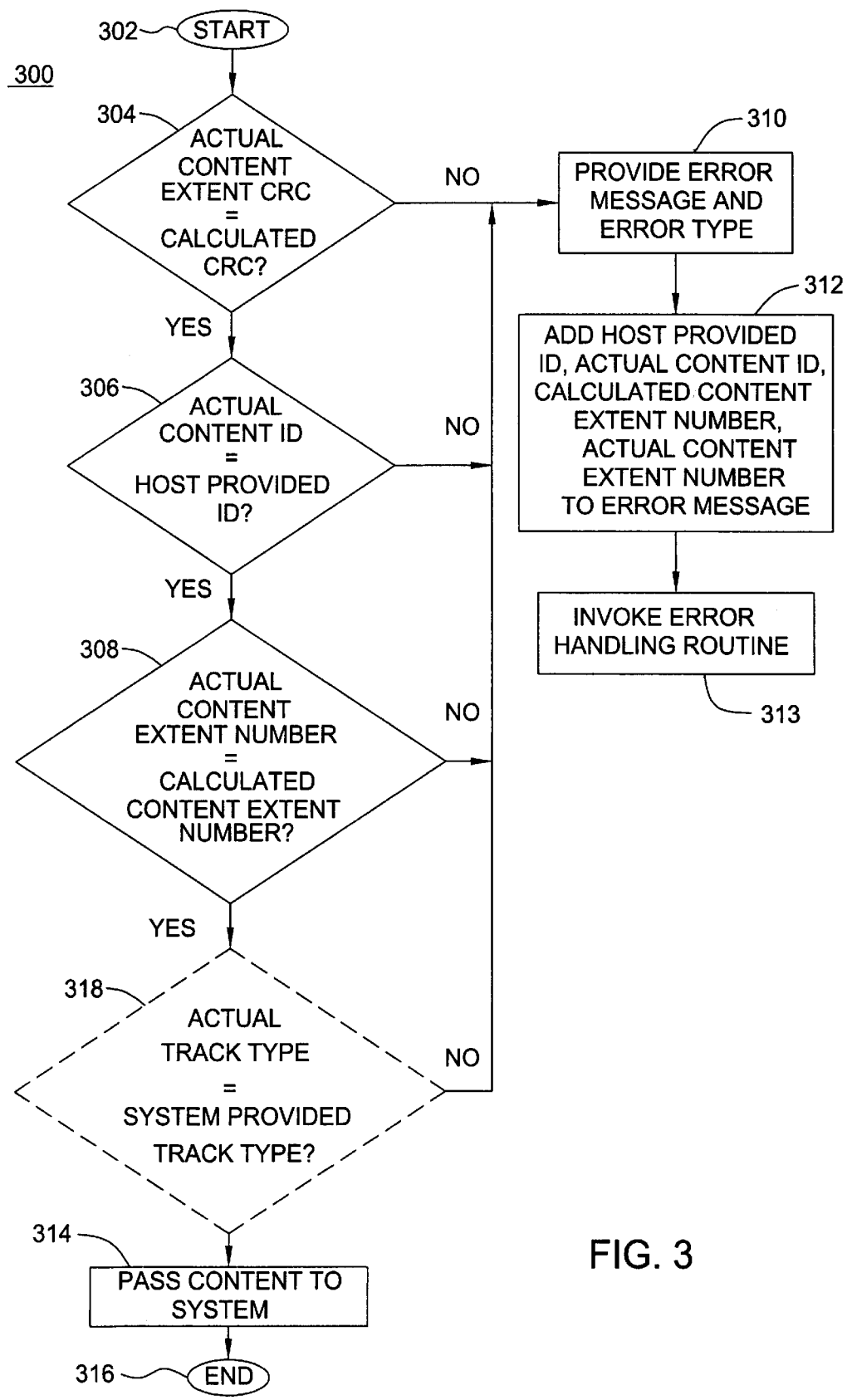
FIG. 3 depicts a flow diagram of a content integrity detection method suitable for use in the interactive information distribution system of FIG. 1.

FIG. 3 depicts a flow diagram of a content integrity analysis method suitable for use in the interactive information distribution system of FIG. 1. Specifically, the method 300 of FIG. 3 is utilized to check each extent to be stored or retrieved from a disk array within the information server 125, or from the information server itself. The method may also be employed to ensure that the transmission of extents to subscribers by the transport processor 150 occurs in an appropriate manner.

The method 300 starts at step 302 and proceeds to step 304, where the CRC data within the CRC field 234 is compared to a calculated CRC. That is, a CRC check is performed on the data within the extent to ensure that the data is not corrupted. If a CRC error is detected, then the method 300 proceeds to step 310. Otherwise, the method 300 proceeds to step 306.

The CRC is calculated with respect to the information contained within the data extent. The information used in the calculator may comprise all data within the data extent (e.g., video packets, audio packets and other packets) or a subset of the included data (e.g., only the video packets or only payload portions of the packets). Thus, the calculated CRC may be selectively utilized to calculate full or partial CRC values based on the information within the time extent. It is important to note that the CRC value included in the CRC field 234 should be calculated using the same technique or data set (or sub-set) as used to provide the calculated CRC value at step 304.

At step 306, the contents of the content ID or UniqueID field is compared to the content ID or UniqueID of the content stream being processed (i.e., being stored, retrieved or transmitted). If an unfavorable comparison results, then the method 300 proceeds to step 310. Otherwise, the method 300 proceeds to step 308.

At step 308 the contents of the logical extent number are compared to the calculated logical extent number of the extent being processed. For example, a counter may be incremented each time an extent is processed, such that the logical extent number of the next extent to be processed should be one increment above the previously processed extent. In this manner, the sequential nature of the extent is preserved. If an unfavorable comparison results, then the method 300 proceeds to step 310. Otherwise, the method 300 proceeds to optional step 318.

At optional step 318, the contents of the track type field 233 are compared to the actual track type of the content stream being processed. In this manner, the contiguous storage, retrieval or transmission of extents having the same logical extent number but representing different tracks (i.e., PLAY, FF or REW tracks) may be avoided. If an unfavorable comparison results, then the method 300 proceeds to step 310. Otherwise, the method 300 proceeds to optional step 314.

At step 314 the extent is passed to the system and processed in the intended manner, such as by storing the extent on a disk or across a disk array, retrieving the extent from the disk or the disk array, transmitting the extent to a subscriber or coupling the extent to another processing or storage element within an information processing system employing the subject invention, such as a networked computer system.

At step 310 an error handling routine is invoked. Specifically, at step 310 an error message including the type of error (wrong ID, wrong type, wrong position, or wrong CRC value) is provided as an error message or appended to a related or existing error message (e.g., a read failure, write failure or transmission failure message). The method 300 then proceeds to step 312, where the system provided Id, the actual content ID, the calculated content extent number and actual content extent number and any other information deemed appropriate are added to the error message. Utilizing such error messages, the system operator or controller may identify faulty content streams and take appropriate action (such as re-transmit, re-store or re-read the extent). The method 300 then proceeds to step 313, where an error handling routine is invoked.

The above-described method 300 is used to analyze content of data streams stored, retrieved or transmitted within an interactive information distribution system. However, it will be appreciated by those skilled in the art that the teachings of the present invention may be advantageously employed in any system processing sequentially arranged data. Additionally, extra fields or identifiers can be added to the extent trailer 230 to further assure the integrity of extents being processed.

Although various embodiments which incorporate the teachings of the present invention have been shown and described in detail herein, those skilled in the art can readily devise many other varied embodiments that still incorporate these teachings.

What is claimed is:

1. A system for content-on-demand, comprising:

service provider equipment including a session controller, an information server and a transport processor, the server provider equipment in communication with subscriber equipment via a distribution network, the server provider equipment configured to provide content on-demand in response to a request from the subscriber equipment;

the content divided into a plurality of content portions, the content portions distributed among disks of an array of disks, each of the content portions comprising a content identification field, a content sequence number field, a track-type field, and a check field.

2. The system of claim 1 wherein each of said content portions comprises a time extent.

3. The system of claim 2, wherein each time extent comprises a data extent and an extent trailer.

4. The system of claim 3, wherein said extent trailer comprises said content identification field, said content sequence number field, said track-type field, and said check field.

5. The system of claim 4, wherein said check field is indicative of a circular redundancy check (CRC) number calculated with respect to content information within said data extent.

6. The system of claim 4, wherein said content sequence number field comprises a logical extent number indicative of a relative position of the data extent within a plurality of extents comprising a content stream.

7. The system of claim 1 wherein the array of disks is an array of hard disk drives.

8. The system of claim 1 wherein the check field is a circular redundancy check field.

9. The system of claim 1 wherein the track-type field comprises track information selected from play, fast forward and rewind.

10. A method for checking integrity of data, comprising:

obtaining first check data from a check data field;

calculating second check data from at least a portion of a data extent;

comparing the first check data and the second check data;

if the first check data and the second check data comparison indicates an error, providing an error message, the error message indicating error type;

adding to the error message, system provided identification, actual content identification assigned content extent number, and actual content extent number, where said identifications are associated with said data indicating an error; and invoking an error handling routine.

11. The method of claim 10 wherein the first check data and the second check data is circular redundancy check data.

12. A method for data integrity checking, comprising:

obtaining first check data from a check data field;

calculating second check data from at least a portion of a data extent;

comparing the first check data and the second check data;

if the first check data and the second check data comparison does not indicate an error, comparing content identification of a content field and a content stream;

comparing extent number assigned and actual extent number; and providing content to a video-on-demand system when the content identification and the extent number comparisons result in matches.

13. The method of claim 12 further comprising comparing track-type of a track-type field and an actual track-type.

14. The method of claim 13 wherein the content is provided to the video-on-demand system when the track-type comparison results in a match.

15. The method of claim 14 wherein the content is provided to the video-on-demand system for transmitting to a subscriber.

16. Apparatus for data integrity checking, comprising:

means for obtaining first check data from a check data field;

means for calculating second check data from at least a portion of a data extent;

mans for comparing the first check data and the second check data;

if the first check data and the second check data comparison does not indicate an error, means for comparing content identification of a content field and a content stream;

means for comparing extent number assigned and actual extent number; and means for providing content to a video-on-demand system when the content identification and the extent number comparisons result in matches.

17. The apparatus of claim 16 further comprising means for comparing track-type of a track-type field and an actual track-type.

18. The apparatus of claim 17 wherein the content is provided to the video-on-demand system when the track-type comparison results in a match.

19. The apparatus of claim 18 wherein the content is provided to the video-on-demand system for transmitting to a subscriber.

* * * * *